(12) United States Patent
Casati et al.

(10) Patent No.: US 9,801,152 B2
(45) Date of Patent: Oct. 24, 2017

(54) MANAGING THE OPERATION OF A MACHINE TYPE COMMUNICATION DEVICE IN A MOBILE COMMUNICATION SYSTEM

(75) Inventors: Alessio Casati, Swindon (GB); Deborah Barclay, Naperville, IL (US); Bruno Landais, Lannion (FR)

(73) Assignee: Alcatel Lucent, Boulogne-Billancourt (FR)

( * ) Notice: Subject to any disclaimer, the term of this patent is extended or adjusted under 35 U.S.C. 154(b) by 856 days.

(21) Appl. No.: 13/696,201

(22) PCT Filed: Apr. 29, 2011

(86) PCT No.: PCT/EP2011/056819
§ 371 (c)(1),
(2), (4) Date: Jan. 25, 2013

(87) PCT Pub. No.: WO2011/138238
PCT Pub. Date: Nov. 10, 2011

(65) Prior Publication Data
US 2013/0122905 A1 May 16, 2013

(30) Foreign Application Priority Data

May 3, 2010 (EP) .................... 10290235

(51) Int. Cl.
*H04W 4/00* (2009.01)
*H04W 60/06* (2009.01)
(Continued)

(52) U.S. Cl.
CPC .......... *H04W 60/06* (2013.01); *H04W 4/005* (2013.01); *H04W 52/0235* (2013.01);
(Continued)

(58) Field of Classification Search
CPC . H04W 4/005; H04W 52/0235; H04W 60/06; H04W 52/0254; H04W 60/04; Y02B 60/50
(Continued)

(56) References Cited

U.S. PATENT DOCUMENTS

2011/0199901 A1* 8/2011 Kavanaugh et al. ...... 370/230.1
2012/0033551 A1* 2/2012 Liao ..................... H04W 28/02
370/230

(Continued)

FOREIGN PATENT DOCUMENTS

CN 101411135 A 4/2009

OTHER PUBLICATIONS

"3rd Generation Partnership Project; Technical Specification Group Services and System Aspects; System Improvements for Machine-Type Communications; (Release 10)," 3GPP TR 23.888V0.3.2, pp. 1-33, XP050434354, Mar. 22, 2010.
(Continued)

*Primary Examiner* — Barry Taylor
(74) *Attorney, Agent, or Firm* — Fay Sharpe, LLP

(57) ABSTRACT

One object of the present invention is o method for managing the operation of a Machine Type Communication MTC Device in a mobile communication system, said method comprising a step of: performing said management within a detach of the MTC Device from the mobile communication network.

33 Claims, 2 Drawing Sheets

(51) Int. Cl.
*H04W 52/02* (2009.01)
*H04W 60/04* (2009.01)

(52) U.S. Cl.
CPC ........ *H04W 52/0254* (2013.01); *H04W 60/04* (2013.01); *Y02B 60/50* (2013.01)

(58) Field of Classification Search
USPC ............... 455/435.1, 522, 426.1, 515, 456.1; 370/311, 328, 389, 331, 235
See application file for complete search history.

(56) References Cited

U.S. PATENT DOCUMENTS

| | | | |
|---|---|---|---|
| 2013/0003576 A1* | 1/2013 | Segura .................. | H04W 4/005 370/252 |
| 2013/0329713 A1* | 12/2013 | Zhang et al. ................. | 370/338 |
| 2014/0044030 A1* | 2/2014 | Ramachandran . | H04W 52/0235 370/311 |
| 2016/0323694 A1* | 11/2016 | Cui ......................... | H04L 47/12 |

OTHER PUBLICATIONS

Intel et al., "MTC Low Mobility—Optimizing periodic LU/RAU/TAU signaling," 3$^{rd}$ Generation Partnership Project (3GPP), 3GPP TSG SA WG2 Meeting #78, TD S2-101669, pp. 1-3, XP050434093, San Francisco, USA, Feb. 22-26, 2010.

International Search Report for PCT/EP2011/056819 dated Jul. 6, 2011.

Samsung, "MTC Extra Low Power Consumption," 3GPP TSG SA WG2 Meeting #78, Feb. 22-26, 2010, San Francisco, USA, TD S2-101138, Document for: Approval, Agenda Item: 9.7, Work Item / Release: NIMTC/Rel-10, 3 pages.

"3rd Generation Partnership Project; Technical Specification Group Services and System Aspects; General Packet Radio Service (GPRS) enhancements for Evolved Universal Terrestrial Radio Access Network (E-UTRAN) access, (Release 8)," 3GPP TS 23.401 V8.9.0 (Mar. 2010), Technical Specification, 241 pages.

Intel, Huawei, China Unicom, CATR, China Mobile, "MTC Low Mobility—Optimizing periodic LU/RAU/TAU signalling," 3GPP TSG SA WG2 Meeting #78 TD, Feb. 22-26, 2010, San Francisco, USA, S2-101741, Document for: Approval, Agenda Item: 9.7, Work Item / Release: NIMTC/Rel-10, 3 pages.

* cited by examiner

FIG_1
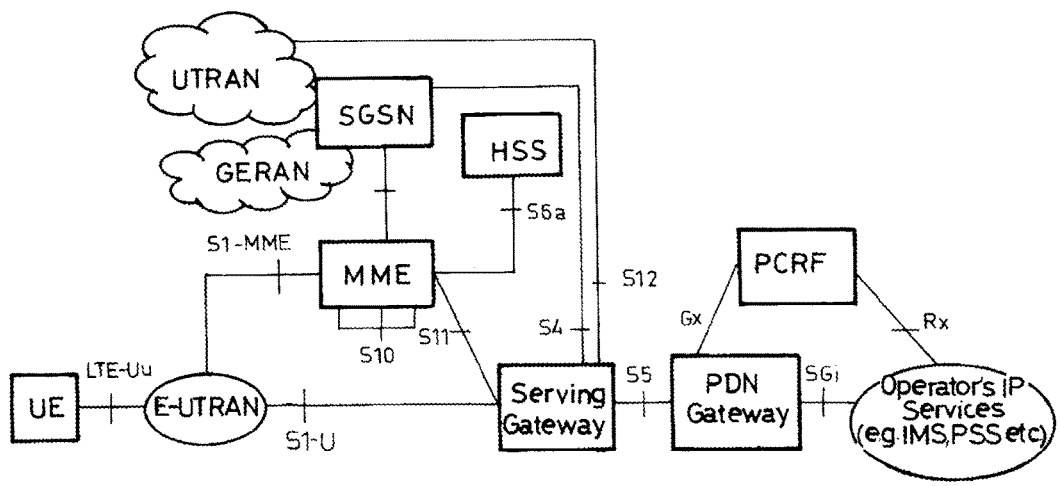
FIG_2
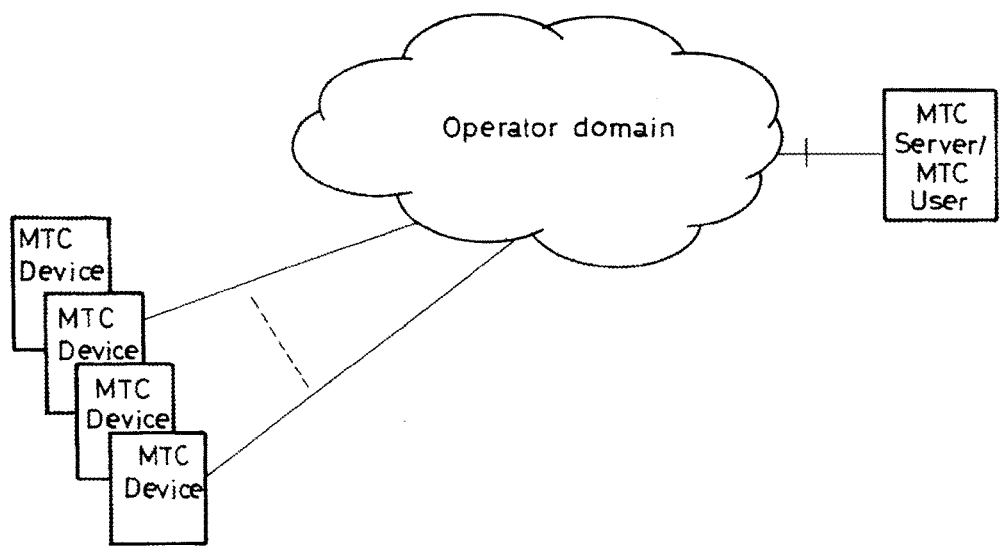

FIG_3
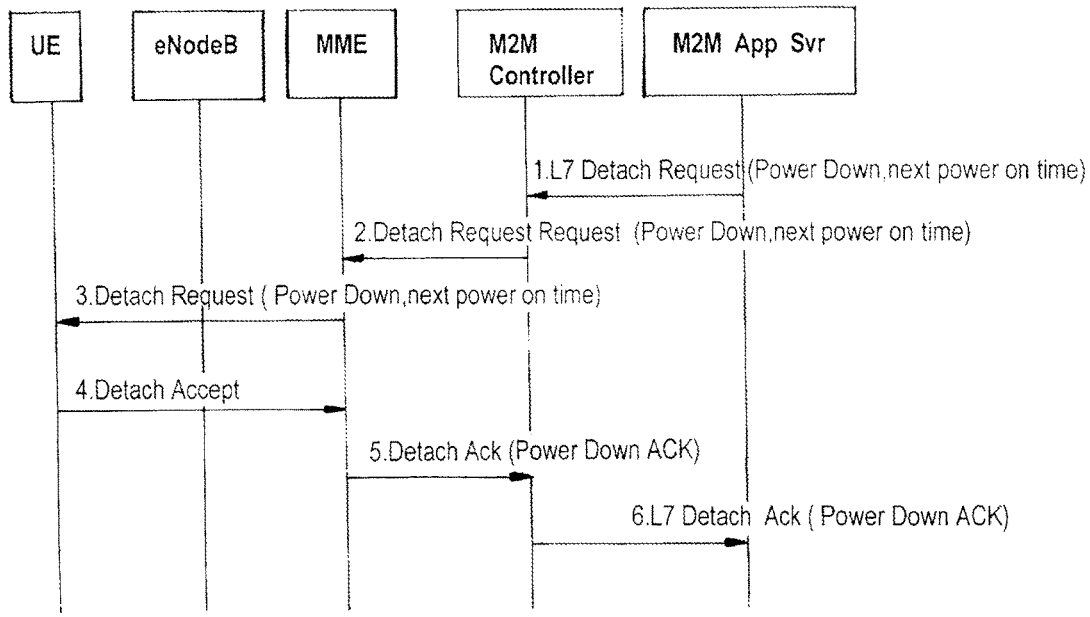
FIG_4
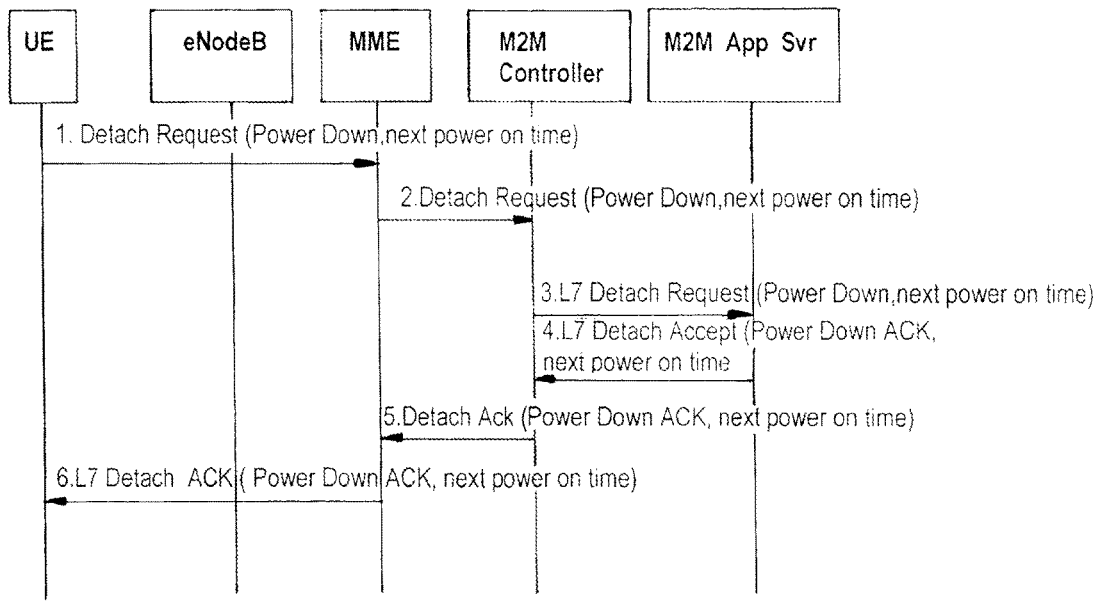

MANAGING THE OPERATION OF A MACHINE TYPE COMMUNICATION DEVICE IN A MOBILE COMMUNICATION SYSTEM

The present invention generally relates to mobile communication networks and systems.

Detailed descriptions of mobile communication networks and systems can be found in the literature, such as in particular Technical Specifications published by standardization bodies such as for example 3GPP ($3^{rd}$ Generation Partnership Project).

In such systems, a mobile terminal or User Equipment (UE) has access to mobile services (such as IP-based mobile services) via an Access Network (such as packet-based Access Network) comprising a Radio Access Network (RAN) and a Core Network (CN).

Examples of 3GPP-based mobile communication systems include 2G GSM/GPRS. 3G UMTS, 3G LTE also known as EPS (Evolved Packet System). Examples of Radio Access Network (RAN) include GERAN (for 2G GSM/GPRS), UTRAN (for 3G UMTS), E-UTRAN (for 3G LIE). Examples of packet Core Network include GPRS (for 2G or 3G) and Evolved Packet Core EPC (for 2G, 3G UTRAN and 3G LTE). For example, a mobile communication system such as EPS is illustrated in FIG. 1, taken from 3GPP TS 23.401.

The present invention more particularly relates to the introduction in mobile communication systems of Machine to Machine (M2M) communication, also called Machine Type Communication (MTC), for example as currently specified by standardization bodies such as 3GPP. In the following, the terms M2M and MTC will be used indifferently. An example of introduction of MTC in mobile networks is illustrated in FIG. 2 taken from 3GPP TS 22.368. An UE equipped for Machine Type Communication, also called MTC Device, communicates through a mobile network (operator domain) with MTC Server(s) and/or other MTC Device(s). A MTC Server performs services for a MIC User.

Mobile communication systems have traditionally been designed for communication with human beings, therefore they are not optimized for Machine Type Communication (MTC) that does necessarily need human interaction.

There is a need to optimise mobile communication systems for Machine Type Communication.

These and other objects are achieved, in one aspect of the present invention, in an embodiment, by a method for managing the operation of a Machine Type Communication MTC Device in a mobile communication system, said method comprising a step of:

performing said management within a detach of the MTC Device from the mobile communication network.

These and other objects are achieved in other aspects of the present invention, by entities for carrying out such method. Such entities may include in particular MTC Device (or User equipment UE equipped for MTC), M2M Application Server, network entity in charge of detach procedure, and M2M controller interfacing on the one hand with a M2M Application Server and on the other hand with a network entity in charge of Detach procedure.

These and other objects of the present invention will become more apparent from the following description token in conjunction with the accompanying drawings:

FIG. 1 is intended to illustrate a mobile communication system such as EPS for example, FIG. 2 is intended to illustrate introduction of MTC in mobile networks, FIGS. 3 and 4 are intended to illustrate managing the operation of an MTC Device, according to embodiments of the present invention.

With the introduction in mobile system of Machine to Machine (M2M) type of applications it is expected that there will be a requirement to support a much higher number of terminals (here referred to as M2M user equipment or M2M UE). Many of these M2M applications will require the network to support many devices that need infrequent network access to upload or download M2M application information. Unlike traditional mobile devices, the network needs to support many devices, but they do not need to be always accessible. The network needs to optimize network resources to support this new type of usage.

Additionally, many M2M terminals will operate on a battery that needs to stay in operation for a long time without battery replacement/re-charge. Terminals located at locations where it is not economical or feasible to provide a power-line connection are required to minimize battery.

The requirement to support large number of devices impacts the network in that both control and user plane nodes will be hit by a linear increase on required resources, unless some measure is taken to activate and deactivate the operation of M2M type of devices (i.e. the time a UE is attached to the network or powered on).

The requirement to minimize power consumption in some M2M applications where the UE is battery operated or where the sheer number of UE's involved may lead to impact on OPEX if the UE is turned on for long intervals when it is not necessary to interact with the network drives the need to control the on/off status of the M2M UE.

Thus, there is a need to optimise mobile communication, systems for Machine Type Communication. In particular, there is a need to manage the operation of MTC Devices, such as managing their access to the network and/or their power consumption.

In an embodiment, it is proposed to perform management of the operation of a MTC Device, within a detach of the MTC Device from the network.

It is recalled that in a mobile communication system, a detach is the counterpart of an attach, which in turn is a process such that a mobile terminal or User Equipment UE can receive service from the network. For example, for EPS, a detach procedure is specified in particular in 3GPP TS 23.401. A detach procedure involves a network entity in charge of said detach procedure, such as for example Mobility Management Entity MME (or S4-SGSN) in EPS. A detach procedure, such as specified for EPS for example, may be an UE-initiated detach procedure or a MME (or S4-SGSN) initiated detach procedure.

In embodiments of the present invention described hereinafter, the case of EPS will mainly be considered. However the present invention is not limited to such example. For example, the present invention also applies to other 3GPP based systems such as in particular GPRS/UMTS, or to non 3GPP based systems.

Embodiments of the present invention described hereinafter may be used together with the MTC function "Time Controlled". Some features of the time Controlled function, as specified in particular in 3GPP TS 22.368, are briefly recalled below.

The MTC feature Time Controlled is intended for use with MTC applications that can tolerate to send or receive data only during defined time intervals and avoid unnecessary signaling outside these defined intervals. For the Time Controlled MTC Feature, in particular:

The network allows access requests (e.g. attach to the network or set up a data-connection) during a defined access grant time interval.

The network may alter the access grant time interval, (e.g. based on criteria such as daily traffic load, time zones).

The network communicates the (altered) access grant time interval to the MTC Device.

Referring to FIGS. 3 and 4, there is illustrated:

a User Equipment UE equipping a MTC Device for Machine Type Communication MTC, a M2M Application Server, noted M2M App Svr, performing services for a MTC User, a network entity in charge of Detach procedure in a mobile communication system, such as for example MME (Mobility Management Entity) in Evolved Packet System EPS, an eNodeB, via which MME communicates with UE, an entity noted M2M Controller, interfacing the M2M Application Server with the network.

In an embodiment illustrated in FIG. 3, following steps are provided:

1. When the M2M User determines the communication with the M2M Device (i.e., UE) is complete, the M2M User (e.g., M2M Application Server) may request the M2M Device to detach from the network. The MTC User may include a power down request to the M2M Controller. The M2M User may also include the next time to access the M2M service, or "grant time interval".

2. The M2M Controller determines the MME serving the M2M Device and forwards the request to it.

3. When the MME receives the Detach request, the MME will forward the request to the MTC Device (i.e., UE). Not specifically illustrated, the MME will also initiate release of beater resources associated with the MTC Device (as per 3GPP TS 23.401). Alternately, it the M2M Device has a MTC Time Controlled feature, the network may initiate the Detach Request when the M2M Devices grant time interval ends.

4. When the MTC Device receives the Detach Request containing a power off indication, the MTC Device will release bearer resources, send a Detach Accept to the MME (via the eNodeB) and power down until the next power on time.

5. The MME will forward the response to the M2M Controller.

6. The M2M Controller will forward the response to the M2M Server (e.g., M2M Application Server).

In an embodiment illustrated in FIG. 4, following steps are provided:

1. When the M2M Device (i.e.) determines the communication with the M2M User (e.g., M2M Application Server) is complete, the M2M Device may request to detach from the network. The MTC Device may include a power down request towards the MME/M2M User. The M2M Device may also include a preferred next time to access the M2M service, or "grant time interval".

2. The MME receives the request. The MME may modify the preferred next time to one preferred by the network (e.g., low usage time of day) and forwards the request to M2M Controller. Not specifically illustrated, the MME will also initiate release of bearer resources associated with the MTC Device (as per 3GPP TS 23.401).

3. When the M2M Controller receives the Detach request, the M2M Controller will forward the request to the M2M User (e.g., M2M. Application Server).

4. When the M2M User (e.g., M2M Application Server) receives the Detach Request containing a power off indication and next power on time, the MTC User may retain the next power on time if provided or set a preferred next power on time, and send a Detach Accept to the M2M Controller with a power down ack and the next power on time.

5. The M2M Controller will forward the response to the MME.

6. The MME will forward the response to the M2M Device. If a next power on time was included, the M2M Device will retain the next power on time, release resources and power down.

In an embodiment, it is proposed that the network enforces a detach of an MTC Device from the network at the end of the of the Device's grant time interval, additionally, the detach order may include a power down command (e.g., for low power MTC Devices) or the (altered) grant time interval.

In an embodiment, it is proposed that if the MTC User has completed communication with the MTC Device prior to the end of the Device's grant time interval, the MTC User may request the network to order the MTC Device to detach from the network, additionally, the order may include a power down command (e.g., for low power MTC Devices) or the (altered) grant time interval.

In an embodiment, it is proposed that if the MTC Device has completed communication with the MTC User prior to the end of the Device's grant time interval and wishes to power down, the MTC Device may request the network to detach the MTC Device from the network; the detach response may include an (altered) grant time interval.

Embodiments or the present invention provide a flexible method to conserve power. By including the time, flexibility is provided over other methods that may be used such a provisioning. Use of a power down command allows devices to know they do not need to be connected to the network until the next power on time and allowing M2M devices to conserve power/battery. The network also conserves resources since it will not need to keep M2M Device resources in the network during this power down period.

In one aspect, the present invention provides a method for managing the operation of a Machine Type Communication MTC Device in a mobile communication system, said method comprising a step of:

performing said management within a detach of the MTC Device from the network;

In an embodiment, said method comprises a step of:

upon determining that the communication with a MTC Device is complete, a M2M Application Server requesting the MTC Device to detach from the network.

In an embodiment, said method comprises a step of:

upon determining that the communication with a MTC Device is complete, a M2M Application Server sending a Detach Request to a M2M Controller interfacing on the one hand with said M2M Application Server and on the other hand with a network entity in charge of Detach procedure.

In on embodiment, said method comprises a step of:

upon receiving a Detach Request from a MTC Application Server, a M2M Controller interfacing on the one hand with said MTC Application Server and on the other hand with a network entity in charge of Detach procedure, forwarding said request to said network entity in charge of Detach procedure.

In an embodiment, said method comprises a step of:
upon receiving a Detach Request from a M2M Controller interfacing on the one hand with said MTC Application Server and on the other hand with a network entity in charge of Detach procedure, the network entity in charge of Detach procedure sending a Detach Request to the MTC Device.

In an embodiment:
said Detach Request includes a power down request.

In an embodiment:
said Detach Request includes a next time to access the M2M service, or "grant time interval".

In an embodiment, said method comprises a step of:
upon reception by a MTC Device of a Detach Request including a power down request, said MTC Device powering down until a next power on time.

In an embodiment, said method comprises a step of:
upon determining that the communication with a M2M. Application Server is complete, a MTC Device requesting to detach from the network.

In an embodiment, said method comprises a step of:
upon determining that the communication with a M2M Application Server is complete, a MTC Device sending a Detach Request to a network entity in charge of Detach procedure.

In an embodiment, said method comprises a step of:
upon reception of a Detach Request from a MTC Device, a network entity in charge of Detach procedure forwarding said request to a M2M Controller interfacing on the one hand with a M2M Application Server and on the other hand with said network entity in charge of Detach procedure.

In an embodiment, said method comprises a step of:
upon reception of a Detach Request from a network entity in charge of Detach procedure, a M2M Controller interfacing on the one hand with a M2M Application Server and on the other hand with said network entity in charge of Detach procedure forwarding said request to said M2M Application Server.

In an embodiment:
said Detach Request includes power down request,

In an embodiment:
said Detach Request includes a next time to access the M2M service, or "grant time interval".

In an embodiment, said method comprises a step of:
upon reception by a M2M Application Server of a Detach Request, said M2M Application Server sending a Detach Accept.

In an embodiment, said method comprises a step of:
upon receiving a Detach Accept from a MTC Application Server, a M2M Controller interfacing on the one hand with said MTC Application Server and on the other hand with a network entity in charge of Detach procedure, forwarding said Detach Accept to said network entity in charge of Detach procedure.

In an embodiment, said method comprises a step of:
upon receiving a Detach Accept from a M2M Controller interfacing on the one hand with an MTC Application Server and on the other hand with a network entity in charge of Detach procedure, the network entity in charge of Detach procedure sending a Detach Accept to the MTC Device.

In an embodiment:
said Detach Accept includes power down request.

In an embodiment:
said Detach Accept includes a next time to access the M2M service, or "grant time interval".

In an embodiment, said method comprises a step of:
upon determining that a M2M Device has a MTC Time Controlled feature, a network entity in charge of detach procedure requesting the M2M Device to detach from the network, at the end of the MTC Device grant time interval.

In an embodiment, said method comprises a step of:
said network entity in charge of detach procedure sending to said MTC Device a Detach Request including power down request.

In an embodiment, said method comprises a step of:
said network entity in charge of detach procedure sending to said MTC Device a Detach Request including a next time to access the M2M service, or "grant time interval".

In an embodiment, said method comprises a step of:
at the end of a MTC Device's grant time interval, a network entity in charge of detach procedure sending to the MTC Device a detach order including a power down command.

In an embodiment, said method comprises a step of:
at the end of the of the MTC Device's grant time interval, a network entity in charge of detach procedure sending to the MTC Device a detach order including a grant time interval or an altered grant time interval.

In an embodiment, said method comprises a step of:
if the MTC User has completed communication with the MTC Device prior to the end of the MTC Device's grant time interval, the MTC User requesting the network to order the MTC Device to detach from the network.

In an embodiment:
said request includes a power down command.

In an embodiment:
said request includes a grant time interval or on altered grant time interval.

In an embodiment, said method comprises a step of:
if the MTC Device has completed communication with the MTC User prior to the end of the MTC Device's grant time interval and wishes to power down, the MTC Device requesting the network to detach the MTC Device from the network.

In an embodiment, said method comprises a step of:
sending to the MTC Device a Detach response including a grant time interval or altered grant time intervals.

In other aspects, the present invention provides entities comprising means for carrying out such method. Such entities may include in particular MTC Device (or User equipment UE equipped for MTC), M2M Application Server, network entity in charge of detach procedure, and M2M controller interfacing on the one hand with a M2M Application Server and on the other hand with a network entity in charge of Detach procedure.

The detailed implementation of the above-mentioned means does not raise any special problem for a person skilled in the art, and therefore such means do not need to be more fully disclosed than has been made above, by their function, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for managing a Machine Type Communication MTC Device in a mobile communication system, said method comprising:
   detecting a detach request; and
   performing said management within a detach procedure of the MTC Device from the mobile communication network;
   wherein management of the MTC device comprises managing of at least one of the access grant time interval and/or power consumption of the MTC device.

2. A method according to claim 1, comprising:
   upon determining that the communication with a MTC Device is complete, a M2M Application Server requesting the MTC Device to detach from the network.

3. A method according to claim 2, wherein:
   said Detach Request includes a power down request.

4. A method according to claim 2, wherein:
   said Detach Request includes a next time to access the M2M service, or "grant time interval".

5. A method according to claim 2, comprising:
   upon reception by a MTC Device of a Detach Request including a power down request, said MTC Device powering down until a next power on time.

6. A method according to claim 1, comprising:
   upon determining that the communication with a MTC Device is complete, a M2M Application Server sending a Detach Request to a M2M Controller interfacing on the one hand with said M2M Application Server and on the other hand with a network entity in charge of Detach procedure.

7. A method according to claim 1, comprising:
   upon receiving a Detach Request from a MTC Application Server, a M2M Controller interfacing on the one hand with said MTC Application Server and on the other hand with a network entity in charge of Detach procedure, forwarding said request to said network entity in charge of Detach procedure.

8. A method according to claim 1, comprising:
   upon receiving a Detach Request from a M2M Controller interfacing on the one hand with said MTC Application Server and on the other hand with a network entity in charge of Detach procedure, the network entity in charge of Detach procedure sending a Detach Request to the MTC Device.

9. A method according to claim 1, comprising:
   upon determining that the communication with a M2M Application Server is complete, a MTC Device requesting to detach from the network.

10. A method according to claim 9, comprising:
    upon determining that the communication with a M2M Application Server is complete, a MTC Device sending a Detach Request to a network entity in charge of Detach procedure.

11. A method according to claim 9, comprising:
    upon reception of a Detach Request from a MTC Device, a network entity in charge of Detach procedure forwarding said request to a M2M Controller interfacing on the one hand with a M2M Application Server and on the other hand with said network entity in charge of Detach procedure.

12. A method according to claim 9, comprising:
    upon reception of a Detach Request from a network entity in charge of Detach procedure, a M2M Controller interfacing on the one hand with a M2M Application Server and on the other hand with said network entity in charge of Detach procedure forwarding said request to said M2M Application Server.

13. A method according to claim 9, wherein:
    said Detach Request includes power down request.

14. A method according to claim 9, wherein:
    said Detach Request includes a next time to access the M2M service, or "grant time interval".

15. A method according to claim 9, comprising:
    upon reception by a M2M Application Server of a Detach Request, said M2M Application Server sending a Detach Accept.

16. A method according to claim 15, wherein:
    said Detach Accept includes power down request.

17. A method according to claim 15, wherein:
    said Detach Accept includes a next time to access the M2M service, or "grant time interval".

18. A method according to claim 9, comprising:
    upon receiving a Detach Accept from a MTC Application Server, a M2M Controller interfacing on the one hand with said MTC Application Server and on the other hand with a network entity in charge of Detach procedure, forwarding said Detach Accept to said network entity in charge of Detach procedure.

19. A method according to claim 9, comprising:
    upon receiving a Detach Accept from a M2M Controller interfacing on the one hand with an MTC Application Server and on the other hand with a network entity in charge of Detach procedure, the network entity in charge of Detach procedure sending a Detach Accept to the MTC Device.

20. A method according to claim 1, comprising:
    upon determining that a M2M Device has a MTC Time Controlled feature, a network entity in charge of detach procedure requesting the M2M Device to detach from the network, at the end of the MTC Device grant time interval.

21. A method according to claim 20, comprising:
    said network entity in charge of detach procedure sending to said MTC Device a Detach Request including power down request.

22. A method according to claim 20, comprising:
    said network entity in charge of detach procedure sending to said MTC Device a Detach Request including a next time to access the M2M service, or "grant time interval".

23. A method according to claim 1, comprising:
    at the end of a MTC Device's grant time interval, a network entity in charge of detach procedure sending to the MTC Device a detach order including a power down command.

24. A method according to claim 1, comprising:
    at the end of the of the MTC Device's grant time interval, a network entity in charge of detach procedure sending to the MTC Device a detach order including a grant time interval or an altered grant time interval.

25. A method according to claim 1, comprising:
if the MTC User has completed communication with the MTC Device prior to the end of the MTC Device's grant time interval, the MTC User requesting the network to order the MTC Device to detach from the network.

26. A method according to claim 25, comprising:
said request including a power down command.

27. A method according to claim 25, comprising:
said request including a grant time interval or an altered grant time interval.

28. A method according to claim 1, comprising:
if the MTC Device has completed communication with the MTC User prior to the end of the MTC Device's grant time interval and wishes to power down, the MTC Device requesting the network to detach the MTC Device from the network.

29. A method according to claim 28, comprising:
sending to the MTC Device a Detach response including a grant time interval or altered grant time interval.

30. A MTC Device or User Equipment equipped for MTC, configured to perform a method according to claim 1.

31. A M2M Application Server configured to perform a method according to claim 1.

32. A network entity in charge of detach procedure, configured to perform a method according to claim 1.

33. A M2M controller interfacing on the one hand with an MTC Application Server and on the other hand with a network entity in charge of Detach procedure, configured to perform a method according to claim 1.

* * * * *